United States Patent Office 3,069,380
Patented Dec. 18, 1962

3,069,380
PROCESS FOR PREPARING SEGMENTED COPOLYMERS
Kenzie Nozaki, El Cerrito, Calif., assignor to Shell Oil Company, a corporation of Delaware
No Drawing. Filed Dec. 7, 1953, Ser. No. 396,734
15 Claims. (Cl. 260—45.5)

This invention relates to a process for preparing copolymers of ethylenically unsaturated organic compounds. More particularly, the invention relates to a process for preparing segmented copolymers from a certain special type of ethylenically unsaturated monomer, to the new copolymers so produced, and to their use, particularly as tailor-made lubricants, detergents, plasticizers, and the like.

Specifically, the invention provides a practical and economical method for preparing copolymers having a segmented structure, i.e., having a segment of one polymer joined through a primary chemical bond to a segment of a dissimilar polymer, which comprises polymerizing, preferably in the substantial absence of molecular oxygen, a special type of ethylenically unsaturated monomer capable of forming long-lived polymer free radicals as described hereinafter in a liquid medium which is a poor solvent for the polymer of that monomer and when substantially no unpolymerized ethylenically unsaturated monomer remains in the reaction mixture adding a thermally polymerizable dissimilar monomer to the reaction mixture, preferably intermittently or continuously over a period of time, and continuing the polymerization in the dark at a temeprature below 50° C. until the dissimilar monomer is polymerized.

Attempts have been made in the past to improve the properties of many of the homopolymers of the unsaturated monomers by copolymerizing the said monomers with various dissimiliar compounds, the homopolymers of which display the desired superior properties. These copolymers have been prepared heretofore by merely mixing the unsaturated compound with the desired dissimilar monomer and then subjecting the resulting mixture to polymerization conditions, such as heat, light and catalysts. When combined under these conditions, the two monomers usually add to the polymer chain in a more or less random fashion and the resulting polymer chains are made up of a very complicated arrangement of the two kinds of monomers. Copolymers prepared from monomers A and B, for example, will have the A and B units arranged in some such order as

ABAABBBABBABBA

This method of producing the desired copolymers is not entirely satisfactory. It has been found, for example, that when the monomer units are distributed throughout the polymer chains in the above-described manner they fail to impart the properties of their corresponding homopolymers and the resulting copolymers in many cases possess an entirely different set of properties. Furthermore, as there is no definite control over the order in which the monomers add to the polymer chain, the copolymers produced by this process rarely, if ever, have the same molecular structure of physical properties, and standardization of the copolymers and their application is quite difficult.

It is an object of the invention to provide a process for producing a new kind of copolymer. It is a further object to provide a process for preparing copolymers which retain many of the important characteristics of the homopolymers of the monomers making up the said copolymers. It is a further object to provide a copolymerization process which yields substantially the same type of product in each operation. It is a further object to provide a method for preparing a new type of copolymer having many unusual and beneficial properties. It is a further object to provide a method for preparing new copolymers which have unexpected solution behavior. It is a further object to provide a method for preparing copolymers which have excellent solubility in both water and oils and may be used as tailor-made lubricants, detergents, plasticizers, and the like. It is a further object to provide a method for preparing copolymers which are pre-plasticized and may be cast, molded or otherwise formed into shaped articles having good strength and flexibility without the external addition of plasticizing materials. These and other objects of the invention will be apparent from the following detailed description thereof.

It has now been discovered that these and other objects may be accomplished by the process of the invention which comprises polymerizing, preferably in the substantial absence of molecular oxygen, a special type of ethylenically unsaturated monomer of the group consisting of monomers having the formula

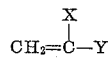

wherein X is halogen or an aliphatic hydrocarbon radical and Y is a monovalent organic radical having the free valence bond attached to a carbon atom and monomers having a terminal methylene group joined to an aliphatic carbon atom through an ethylenic linkage which is in conjugated relationship with another ethylenic linkage, which monomers are capable of forming long-lived polymer free radicals, in a liquid medium which is a poor solvent for the polymer of that monomer and when substantially no unpolymerized ethylenically unsaturated monomer remains in the reaction mixture adding a thermally polymerizable dissimilar monomer to the reaction mixture, preferably intermittently or continuously over a period of time, and continuing the polymerization in the dark at a temperature below 50° C. until the dissimilar monomer is polymerized.

The above process is based in part upon the unexpected discovery that when members of the above-described group of ethylenically unsaturated monomers are polymerized under certain specific conditions indicated hereinafter they are able to form polymer nuclei which continue to exist as free radicals even after the monomer has been consumed and the energy source has been removed. When a dissimilar monomer is added to the reaction mixture containing these long-lived polymer free radicals the said monomers add to the polymer nuclei in the ordinary manner. The resulting product is a copolymer made up of two distinct sections joined end to end, such as A—B, section A being made up entirely of the initial ethylenically unsaturated monomer forming the long-lived polymer free radicals and section B being made up substantially of the dissimilar monomer added to the mixture containing the long-lived polymer free radicals. As the monomers are grouped together in one section in the novel copolymers and are not distributed throughout the entire polymer chain, the said monomers are able to impart many of the properties of their corresponding homopolymers, and the final product will have many of the desired characteristics of the homopolymers of the monomers utilized in their production.

It has also been found that under the specific conditions of the process of the invention, i.e., adding the dissimilar monomer to the mixture containing the long-lived polymer free radicals at a temperature below 50° C., and preferably intermittently or continuously over a period of time, the said dissimilar monomers add selectively the long-lived polymer free radicals instead of forming new homopolymer nuclei and as a result the finished product consists of the above-described segmented copolymers substantially free of homopolymers.

The above-described process is of particular advantage in producing copolymers which are tailor-made for or can be easily adapted for certain special industrial applications. With the process, for example, it is possible to prepare copolymers which have or can be easily converted to products which possess varying solubilities in both oil and water and are therefore ideally suited for use as specialized lubricants or additives for lubricating compositions, and as detergents, emulsifying agents, wetting agents and the like. For example, polymers having solubility in water and oil may be obtained by the above-described process by employing a monomer, such as isoprene, to form the long-lived polymer free radicals, and as the unsaturated dissimilar monomer, a monomer as methyl methacrylate, which has groups which may be converted to other groups having water-soluble characteristics, or such polymers may be obtained by using a monomer with groups that may be converted to water-soluble groups, such as methacrylonitrile or methyl methacrylate, as the ethylenically unsaturated monomer which forms the long-lived polymer free radicals, and then using a long-chain ester, such as lauryl methacrylate, as the dissimilar monomer to form the component having the desired solubility in oil. Copolymers of this type are particularly useful as detergents and as dispersing agents for preparing suspensions and emulsions of various components, such as metal oxides, that will not be precipitated either in aqueous or hydrocarbon systems.

Still another important application of the process of the invention is its use in the preparation of "internally" plasticized polymers, i.e., polymers wherein the plasticizer is joined to the polymer through a primary chemical bond. The production of this type of polymer is accomplished by selecting as the monomer capable of forming the long-lived polymer free radicals one which forms a soft, flexible polymer, and then adding as the dissimilar monomer one that will form a harder more brittle polymer, such as vinylidene chloride, or the monomer forming the long-lived polymer free radicals may be one that forms the hard brittle polymer and the dissimilar monomer one that forms a softer, more flexible polymer. In either case, the resulting product is one that possesses a softer more flexible polymer segment which tends to plasticize the copolymer product. As the plasticizer is chemically bound in the molecule, there is no danger of its loss through migration or volatilization.

As indicated above, the monomers to be used in preparing the long-lived polymer free radicals comprise the monomers of the formula $$CH_2=\overset{X}{\underset{|}{C}}-Y$$

wherein X is a halogen or an aliphatic hydrocarbon radical and Y is a monovalent organic radical which has the free bond of the radical attached to a carbon atom and monomers having a terminal methylene group joined to an aliphatic carbon atom through an ethylenic linkage which is in conjugated relationship with another ethylenic linkage. Examples of this particular group of monomers are 2-chloro-propene-1,
2-chlorobutadiene-1,3,
2-chlorobutene-1,
alpha-chlorostyrene,
isoprene,
butadiene,
dimethylbutadiene,
methallyl chloride,
methallyl acetate,
ethallyl benzoate,
alpha-chlorallyl caproate,
dimethallyl phthalate, 3-methallyl-cyclohexanone,
alpha-chloroacrylonitrile,
butyl 4-chloro-4-pentenoate,
ethyl alpha-bromoacrylate,
alpha-methyl-4-methoxystyrene,
alpha-methoxystyrene,
alpha-acetyl-alpha-cyanostyrene,
alpha-ethenylstyrene,
2-ethenylbutene-1,
butyl alpha-chloroacrylate,
2-bromo-1-hepten-3-one,
4-methallylbenzonitrile,
4-chloro-4-pentenamide,
N-butyl 4-chloro-4-pentenamide,
N-cyclohexyl 4-methyl-4-pentenamide,
4-amyl-4-pentenamide,
4-butyl-4-penten-2-one,
4-iodo-4-pentenamide,
N-phenyl 4-methyl-4-pentenamide,
3-fluoro-3-butenenitrile,
3-chloro-3-butenenitrile,
5-isopropyl-5-hexenenitrile,
4-methallyl-1-acetoxybenzene,
4-carbamyl-2-butyl-1-butene,
alpha-methylvinylcyclopentane,
4-carboxy-2-chloro-1-pentane,
4-methallylbenzamide,
3-alpha-methylvinylcyclohexanamide,
7-ethallyl-2-naphthamide, and
3-ethallyl-1-acetylbenzene The preferred monomers to be utilized in the process of the invention are those monomers of the formula $$CH_2=\overset{X}{\underset{|}{C}}-Y$$

wherein X is a halogen or alkyl radical and Y is a monovalent radical having the free bond of the radical joined to carbon and possessing a grouping which activates addition polymerization, preferably within 5 carbon atoms of the double bond, as —COOH, —COOH substituted radicals, ester radicals as $$-CH_2O-\overset{O}{\underset{\|}{C}}R$$

radicals (wherein R is a hydrocarbon radical), ester substituted radicals as $$-R_1CH_2O\overset{O}{\underset{\|}{C}}-R$$

radicals wherein $R_1$ is a bivalent hydrocarbon radical, cyano and cyano-substituted radicals, the amide and amide-substituted radicals, ketone radicals as $$-\overset{O}{\underset{\|}{C}}-R$$

(wherein R is a hydrocarbon radical) and ketone-substituted radicals as $$-R_1-\overset{O}{\underset{\|}{C}}-R$$

wherein $R_1$ is a bivalent hydrocarbon radical, ether radicals as —$CH_2$—O—R (wherein R is a hydrocarbon radical) and ether-substituted radicals as —$R_1$—$CH_2OR$ wherein $R_1$ is a bivalent hydrocarbon radical, and the alkenyl radicals. These preferred monomers may be exemplified by butyl 2-methyl-2-propenoate,
ethyl 3-methyl-3-butenoate,
isobutyl 4-ethyl-4-pentenoate,
amyl 4-butenyl-4-pentenoate,
methallyl acetate,
ethallyl benzoate,
dimethallyl phthalate,
2-methyl-2-propenenitrile,
3-hexenyl-3-butenenitrile, 4-butyl-4-pentenenitrile,
3-ethallyl-2-naphthamide,
5-isopropyl-5-hexenenitrile,
N-butyl 2-methyl-2-propenamide,
N-cyclohexyl 2-methyl-2-propenamide,
2-methyl-2-propenamide,
3-ethyl-3-butenamide,
3-hexenyl-3-butenamide,
4-isobutyl-4-pentenamide,
4-amyl-4-pentenamide,
3-methyl-3-buten-one,
3-ethyl-3-buten-2-one,
4-butyl-4-penten-2-one,
4-isopropyl-4-penten-3-one,
5-amyl-5-penten-2-one, and
5-ethyl-5-penten-4-one A particularly preferred group of vinyl-type monomers are those of the general formula $$CH_2=\overset{X}{\underset{}{C}}-Y$$

wherein X is a member of the group consisting of halogen atoms and alkyl radicals and Y is a member of the group consisting of $-(CH_2)_nCN$ radicals,

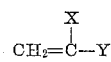

radicals,

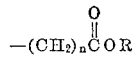

radicals,

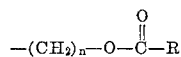

radicals,

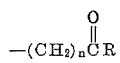

radicals,

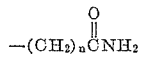

radicals,

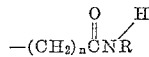

radicals and alkenyl radicals, the n in the foregoing radicals being an integer from 0 to 5 and R being a hydrocarbon radical, preferably an alkyl radical containing from 1 to 8 carbon atoms. Examples of this particularly preferred group of monomers are methacrylonitrile,
methyl methacrylate,
methallyl acetate,
methallyl octanoate,
methyl isopropenyl ketone,
4-ethyl-4-pentenoate,
amyl-4-amyl-4-pentenoate,
4-butyl-4-pentenenitrile,
4-chloro-4-pentenoate,
4-isobutyl-4-pentenamide,
N-cyclohexyl 4-isobutyl-4-pentenamide,
4-amyl-4-pentenamide,
4-amyl-4-pentenamide,
3-chloro-3-buten-2-one,
N,N-dibutyl 4-butyl-4-pentenamide, and
4-isopropyl-4-penten-3-one.

The dissimilar monomer to be added to the polymer free radicals formed from the above-described monomers are the thermally polymerizable ethylenically unsaturated monomers dissimilar to the said monomers forming the long-lived polymer free radicals. The expression "thermally polymerized monomers" as used herein refers to those monomers which are able to form polymers, i.e., compositions greater than dimers, when they are exposed in the pure state in the absence of molecular oxygen to a temperature up to 100° C. Monomers that fall into this category may be easily determined by carefully distilling the monomer, placing the monomer in a carefully cleaned Pyrex tube, removing the oxygen from the tube, sealing it and heating the tube up to 100° C. in the dark for, say, several days and then analyzing the product for the presence of polymer.

Examples of the above-described monomers include, among others, the esters of acrylic acids which have a hydrocarbon radical or a halogen atom substituted on alpha-carbon atom, such as methyl methacrylate, butyl methacrylate, octyl methacrylate, lauryl methacrylate, methyl alpha-hexylacrylate, octadecyl methacrylate, vinyl methacrylate, ethyl alpha-chloroacrylate, butyl alpha-chloroacrylate, lauryl alpha-chloroacrylate, and styrene, mono- and dichlorostyrene, vinylidene chloride, chloroprene, acrolein, and the like.

Preferred members of thermally polymerizable monomers include the monoethylenically unsaturated compounds of the group consisting of alkyl esters of alphachloro- and alpha-alkyl-substituted acrylic acids, preferably those wherein the alkyl radicals contain from 1 to 8 carbon atoms, styrene, and vinylidene chloride.

According to the process of the invention, one first polymerizes the above-described special type of ethylenically unsaturated monomer under the conditions needed to form the long-lived polymer free radicals and then when substantially all of that monomer has been consumed adding the above-described thermally polymerizable dissimilar monomer.

The formation of the long-lived polymer free radicals occurs when precipitation or gelation of the polymer takes place. It is necessary, therefore, that the polymerization of the special unsaturated monomers be accomplished in a medium which is a relatively poor solvent for the finished polymer. Many of the special unsaturated monomers are relatively insoluble in water and the polymerization is preferably conducted in an aqueous emulsion or suspension system. Some of the polymers of these monomers are, however, insoluble in solvents, such as cyclohexane, butane, hexane, and benzene and the polymerization may also be conducted in the presence of such solvents. Many of the polymers are also insoluble in the monomer so bulk polymerization may also be utilized in the preparation of the long-lived polymer radicals.

Heat, light and polymerization catalyst and any combination thereof may be utilized to initiate the polymerization. If polymerization catalysts are employed, they should be utilized in only relatively small amounts as high catalyst concentrations are detrimental to the formation of the long-lived polymer free radicals. Examples of polymerization catalysts that may be employed are the peroxides, such as benzoyl peroxide, acetyl peroxide, hydrogen peroxide, tert-butyl peroxide, the peracids, such as persulfuric acid, peracetic acid, and perphthalic acid, the per-salts, such as potassium persulfate, the peresters, such as tert-butyl perbenzoate, and the like. Mixtures of catalysts may also be used. The amount of the catalyst, in general, should not exceed 1.5% by weight of the monomer being polymerized but the exact amount of catalyst that can be tolerated in the process may best be calculated for each individual case by a few routine determinations.

Light rays, preferably those in the ultraviolet portion of the spectrum may also be used to initiate the polymerization of the initial monomer.

Temperatures that may be employed in the polymerization of the special unsaturated monomers may vary over a considerable range depending upon the type of monomer being polymerized, presence or absence of catalyst, etc. If catalysts are employed, the temperature will depend upon the decomposition temperature of the catalysts. If no catalyst is employed, the temperature will usually be governed by the type of monomer being polymerized. In general, temperatures between 20° C. to 150° C. will be sufficient to bring about the desired formation of long-lived polymer free radicals. Preferred temperatures vary from about 40° C. to about 90° C. Atmospheric, superatmospheric, or subatmospheric pressures may be utilized as desired.

In most cases, molecular oxygen will tend to inhibit long-lived polymer free radical formation and it is desirable to exclude the said oxygen from the reaction. The removal of the oxygen may be accomplished by any suitable method. It is preferably accomplished by freezing the mixture and evacuating the reaction chamber by suitable means. In some cases, it may be desirable to replace the withdrawn oxygen with an inert gas, such as nitrogen, methane, carbon dioxide, and the like.

Various types of additives may be added to the reaction mixture before or any time during the initial polymerization step provided the addition does not interfere with the formation of or destroy the already formed long-lived polymer free radicals. These additives include emulsion stabilizers, lubricants, dyes, photosensitizers, plasticizers, and the like. The nature and amount of the additive will depend upon the monomer being polymerized and the intended use of the final product.

The polymerization of the initial monomer is continued until there is substantially no unpolymerized monomer present in the reaction mixture. This may be accomplished by continuing the polymerization until it appears that substantially all of the monomer has been polymerized, or alternatively, by interrupting the polymerization at any stage in the process and removing substantially all of the unpolymerized monomer from the reaction mixture by conventional means. A polymerization of 100% of the monomer, or a complete removal of all of the unpolymerized monomer is usually quite difficult to obtain as in many cases some of the monomer will be retained within the polymer chain, etc. Therefore, the expression "substantially all" as used throughout the specification and claims in regard to the polymerization of the initial monomer, or the removal of the unpolymerized initial monomer from the reaction mixture is meant such a complete removal or polymerization as can generally be accomplished, e.g., a polymerization of at least 94% of the initial monomer, or a removal of all but 6% or less of the unpolymerized monomer.

After the reaction mixture containing the polymer free radicals of the special unsaturated monomers has been substantially freed of the basic monomer, the above-described therally polymerizable dissimilar monomer is then added. The monomer added may be a single dissimilar monomer or a mixture of two or more of the monomers may be employed. The monomer or monomers selected are preferably deoxygenated before being added to the freshly prepared medium containing the long-lived polymer free radicals.

If the dissimilar monomer to be added is one which is unable to form long-lived polymer radicals, it is preferably added to the reaction mixture intermittently or continuously over a period of time so as to not build up a large amount of the monomer in the reaction mixture at one time. More specifically, the dissimilar monomer is preferably added at about the rate at which it is consumed in the reaction mixture.

The amount of the dissimilar monomer added will depend upon the ratio in which the said monomers are desired in the final product. Thus, for example, if the desired product is a copolymer of 25% polymethacrylonitrile and 75% methyl methacrylate, the amount of the methyl methacrylate added to the active polymethacrylonitrile will be about three times the amount of the active polymer.

After the thermally polymerizable monomer has been added to the freshly prepared composition containing the long-lived polymer free radicals, the reaction mixture is maintained in the dark at a temperature below 50° C., and preferably below 30° C. Under these conditions, there is a selective addition of the dissimilar monomer to the long-lived polymer free radicals rather than the formation of new homopolymer nuclei. The pressures employed in the polymerization step may be atmospheric, superatmospheric or subatmospheric, as desired.

It is usually preferred to accomplish the polymerization of the added dissimilar monomer in the absence of molecular oxygen, at least during the initial stages of the reaction. In some cases it may be desirable to replace the withdrawn oxygen with an inert gas, such as nitrogen, methane, carbon dioxide and the like. Atmospheric, superatmospheric and subatmospheric pressures may be used.

It may also be desirable to add various additives before or at any time during this latter polymerization step. These additives include emulsion stabilizers, lubricants, dyes, plasticizers, and the like. The type and amount of the additive will depend upon the monomer being polymerized and the intended use of the final product.

If the dissimilar monomer added to the active polymer nuclei is a monomer of the special group described above which is capable of forming long-lived polymer free radicals and the conditions employed are those conducive to the formation of long-lived polymer free radicals, the copolymer produced by the process will in turn be a long-lived polymer free radical and a third dissimilar monomer may be added to form a three component copolymer A—B—C, wherein A is a section made up entirely of the initial monomer, B is a section made up of the second monomer, and C is a section made up of the third dissimilar monomer. The process may be continued in the same manner to form a four, five, six, etc., component copolymer providing the above-described conditions are maintained.

At the completion of the reaction the copolymers may be separated from the reaction mixture by any suitable means, such as filtration, coagulation, and the like.

It is preferred to accomplish the process of the invention in an aqueous emulsion as the required conditions for producing the long-lived polymer free radicals are more easily obtained by that method. According to the preferred method of operation the vinyl-type monomer is combined with a mixture of water and emulsifying agent, the resulting mixture is exposed to heat and/or light to polymerize the said vinyl-type monomer and the dissimilar monomer is then added and the polymerization continued.

Emulsifying agents that may be employed in the preferred process include the soaps, such as sodium and potassium myristate, laurate, palmitate, oleate, stearate, rosinate and hydroabietate; the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof, and salts of higher amines as lauryl amine hydrochloride and stearyl amine hydrobromide.

The amount of the emulsifying agent to be employed in the polymerization mixture will vary over a considerable range depending upon the particular material being polymerized, the amount of water present in the mixture and the type or amount of other ingredients added thereto. In general, the amount will vary from 0.1% to 5% by weight of monomer. The preferred amount of emulsifying agent to be employed will vary between .1% to 1% by weight of monomer.

It is usually desirable to maintain a low ratio between the amount of monomer and amount of water present in the initial aqueous emulsion, e.g., between 1:2 and 1:5, preferably 1:3. With lower phase ratios there is more monomer available per long-lived radical and the polymer chain is able to grow to a higher molecular weight.

Any of the above-described polymerization catalysts may be used in the aqueous emulsion in the polymerization of the initial monomer, such as benzoyl peroxide, acetyl peroxide, hydrogen peroxide, tert-butyl peroxide, potassium persulfate, tert-butyl perbenzoate, and the like. The amount of the catalyst, in general, should not exceed 1.5% by weight of the monomer being polymerized but the exact amount of catalyst that can be tolerated in the reaction may best be calculated for each individual case by a few routine determinations.

Temperatures employed in the polymerization of the initial monomer in the aqueous emulsion will generally vary between 40° C. and 100° C., preferably between 50° C. and 75° C. Light rays, e.g., those having wave lengths of 1800 to 5000 Angstroms, may also be used in the polymerization of the initial monomer.

The conditions employed in the aqueous emulsion polymerization process after the addition of the dissimilar monomer will be those disclosed for these stages of the process in the above-described description of the general process of the invention.

The copolymers will be formed in the aqueous emulsion as a latex which may be separated by any suitable means, such as coagulation with electrolytes, solvents, freezing, and the like.

The copolymers produced by the process of the invention will have properties closely relating to those of the homopolymers of the monomers contained in the said copolymers. As the properties may be conveniently predicted in most cases by a proper selection of monomers the copolymers may be produced to fit substantially any desired industrial application. As indicated above, copolymers may be made by the process for use as lubricants, detergents, wetting agents, plasticizers or for use in preparing shaped articles. The copolymers also find use in the preparation of surface coating compositions, laminating and impregnating compositions, and the like.

To illustrate the manner in which the invention may be carried out the following examples are given. It is to be understood, however, that the examples are for the purpose of illustration and the invention is not to be regarded as limited to any of the specific conditions cited therein.

In the following examples the deoxygenation was accomplished by freezing the mixture in liquid nitrogen, evacuating on an oil pump, melting, and repeating the step three more times.

The irradiation was accomplished by placing the reaction chamber constructed of soft glass about one inch away in air from a General Electric H–5 lamp from which the Pyrex jacket had been removed.

The copolymers were coagulated by freezing at −20° C. or by precipitation with sodium chloride at 90° C.

Parts described in the examples are parts by weight.

*Example I*

About 100 parts of methacrylonitrile were mixed with 600 parts of water and 0.33% sodium lauryl sulfate, the mixture deoxygenated and then irradiated with ultraviolet light until all of the methacrylonitrile was polymerized. 75 parts of deoxygenated methyl methacrylate were then added and the polymerization continued in the absence of light at 25° C. The copolymer was precipitated and analyzed. Analysis indicated it was made up of 100 parts of polymeric methacrylonitrile joined through a primary chemical bond to a segment made up of polymeric methyl methacrylate. No uncombined poly(methyl methacrylate) could be detected in the reaction mixture.

*Example II*

About 100 parts of methacrylonitrile are mixed with 600 parts of water and 0.33% sodium lauryl sulfate, the mixture deoxygenated and then irradiated with ultraviolet light until a greater part of the methacrylonitrile has been polymerized and then the remaining monomeric methacrylonitrile removed. 100 parts of deoxygenated lauryl methacrylate are then slowly added to the reaction mixture and the polymerization continued in the absence of light at a temperature of 30° C. Analysis of the resulting copolymer indicated that the product consists of a segment of poly(methacrylonitrile) joined to a segment of poly(lauryl methacrylate). This copolymer has been found to have promising properties as an additive for lubricating oils.

*Example III*

About 100 parts of methyl alpha-chloroacrylate are mixed with 500 parts of water, 0.33% sodium lauryl sulfate and 0.5% potassium persulfate and the mixture deoxygenated. This mixture is then heated to 70° C. until substantially all of the monomer has been polymerized. 100 parts of methyl methacrylate are then added and the polymerization continued in the dark at a temperature below 25° C. After the methyl methacrylate has been polymerized the copolymer is precipitated and analyzed. The analysis indicated that the product is polymeric methyl alpha-chloroacrylate joined through a primary chemical bond to polymeric methyl methacrylate. No uncombined poly(methyl methacrylate) was detected in the mixture.

*Example IV*

About 100 parts of methyl methacrylate are mixed with 600 parts of water, 0.33% sodium lauryl sulfate, and 0.33% potassium persulfate, the mixture deoxygenated and heated to 50° C. until substantially all of the methyl methacrylate is polymerized. 50 parts of vinylidene chloride are then slowly added to the reaction mixture at about the rate at which it is being consumed and the polymerization continued at a temperature of about 30° C. The resulting product is a copolymer of about 100 parts of polymeric methyl methacrylate and about 50 parts of polymeric vinylidene chloride. Calendered sheets prepared from this copolymer have greater flexibility than those prepared from a homopolymer of vinylidene chloride.

Segmented copolymers having related properties are obtained by replacing the methyl methacrylate in the above-described process with equivalent amounts of butyl methacrylate and lauryl methacrylate.

*Example V*

(A) About 100 parts of methyl methacrylate are mixed with 600 parts of water and 0.5% sodium lauryl sulfate, the mixture deoxygenated and then heated to 60° C. until substantially all of the monomer has been polymerized. About 60 parts of deoxygenated styrene are then slowly added to the resulting mixture at about the same rate at which it is consumed and the polymerization continued in the dark at about 30° C. The resulting product is a copolymer of about 100 parts of poly(methyl methacrylate) joined to a segment of poly(styrene).

(B) No such segmented polymers are obtained, however, if the process is reversed, i.e., if the styrene is polymerized in the first part of the process and then the methyl methacrylate added. In this case, the resulting product is merely a mixture of a homopolymer of styrene and a small amount of a homopolymer of methyl methacrylate which could be separated.

*Example VI*

About 100 parts of methyl isopropenyl ketone are mixed with 600 parts of water, 0.33% sodium lauryl sulfate, the mixture deoxygenated and heated at 60° C. to polymerize the methyl isopropenyl ketone. 50 parts of deoxygenated hexyl methacrylate are then slowly added to the resulting mixture at about the same rate at which it is consumed and the polymerization continued in the dark at about 50° C. The resulting product is a copolymer of about 100 parts of poly(methyl isopropenyl ketone) joined to a segment of poly(hexyl methacrylate). No uncombined poly(hexyl methacrylate) is detected in the reaction mixture.

Related segmented copolymers are obtained by replacing the methyl isopropenyl ketone in the above-described process with equivalent amounts of each of the following: isopropenyl butyl ether, isopropenyl amyl ether and amyl isopropenyl ketone.

*Example VII*

About 100 parts of methacrylamide are mixed with 600 parts of water, 0.33% sodium lauryl sulfate, the mixture deoxygenated and irradiated with ultraviolet light at 30° C. to polymerize the methacrylamide. 75 parts of deoxygenated octyl methacrylate are then slowly added to the resulting mixture at about the same rate at which it is consumed and the polymerization continued in the dark at about 40° C. The resulting product is a copolymer of about 100 parts of poly(methacrylamide) joined to a segment of poly(octyl methacrylate).

Copolymers having related properties are obtained by replacing the methacrylamide in the above-described process with equivalent amounts of N-butyl methacrylamide and N,N-dibutyl methacrylamide.

*Example VIII*

About 100 parts of methacrylonitrile are mixed with 600 parts of water, 0.33% sodium lauryl sulfate, 0.75 part of potassium persulfate, the mixture deoxygenated and heated to 75° C. to 100° C. to polymerize the methacrylonitrile. About 50 parts of deoxygenated chloroprene are then slowly added to the resulting mixture and the polymerization continued in the dark at about 50° C. The resulting product is a copolymer of poly(methacrylonitrile) joined to a segment of poly(chloroprene).

*Example IX*

About 100 parts of methallyl acetate are mixed with 600 parts of water, 0.33% sodium lauryl sulfate, 0.75 part of potassium persulfate, the mixture deoxygenated and heated to 75° C. to polymerize all of the methallyl acetate. About 75 parts of deoxygenated methyl alpha-chloroacrylate are then slowly added to the resulting mixture and the polymerization continued in the dark at about 40° C. The resulting product is identified as a copolymer of poly(methallyl acetate) joined to a segment of poly(methyl alpha-chloroacrylate).

*Example X*

A segmented copolymer is also obtained by polymerizing 100 parts of chloroprene in 600 parts of water, 0.33% sodium lauryl sulfate and 0.75 part of potassium persulfate at 60° C. until all of the chloroprene is polymerized and then adding 50 parts of methyl methacrylate and continuing the polymerization at 45° C.

This application is a continuation-in-part of my application Serial No. 92,089, filed May 7, 1949, now abandoned.

I claim as my invention:

1. A process for preparing segmented copolymers which consists essentially of adding, in the absence of any further addition of polymerization catalyst, (A) a thermally polymerizable monoethylenically unsaturated monomer which monomer forms products greater than dimers when exposed in the pure state in the absence of molecular oxygen to a temperature up to 100° C. and which monomer is substantially free of oxygen, to (B) a freshly prepared composition which has been obtained by polymerizing, in the substantial absence of molecular oxygen and until there is substantially no unpolymerized monomer remaining, a special ethylenically unsaturated monomer which is dissimilar to the monomer used in (A) above and is a member of the group consisting of (1) monomers of the formula

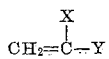

wherein X is a halogen and Y is a member of the group consisting of

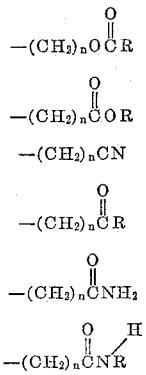

and $-(CH_2)_nOR$ wherein R is an alkyl radical and $n$ is an integer from 0 to 5, and (2) monomers of the formula

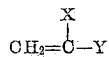

wherein X is an alkyl radical and Y is as described above, the aforedescribed monomers in (B) being capable of forming polymer long-lived free radicals, in a liquid medium which is a poor solvent for the polymer of monomers described in (B) and maintaining the mixture of (A) and (B) in the dark at a temperature below 50° C. in the substantial absence of molecular oxygen, until the monomer (A) has been polymerized.

2. A process as defined in claim 1 wherein composition (B) is obtained by polymerizing the special ethylenically unsaturated monomers in an aqueous emulsion at a temperature between 40° C. and 100° C.

3. The process of claim 1 wherein composition (B) is obtained by exposing an aqueous emulsion containing the special ethylenically unsaturated monomer to ultraviolet light.

4. The process of claim 1 wherein composition (B) is obtained by exposing the special ethlenically unsaturated monomer to ultraviolet light in an aqueous emulsion containing 0.1% to 1% of emulsifying agent based on the weight of the monomer content.

5. A process as in claim 1 wherein the monomer (A) is an alkyl ester of alpha-alkylacrylic acid.

6. A process as in claim 1 wherein the monomer (A) is an alkyl ester of alpha-chloroacrylic acid.

7. A process as in claim 1 wherein the monomer (A) is a vinylidene halide.

8. A process as in claim 1 wherein the special ethylenically unsaturated monomer used to prepare composition (B) is an alkyl ester of alpha-alkylacrylic acid.

9. A process as in claim 1 wherein the special ethylenically unsaturated monomer is methacrylonitrile.

10. A process as in claim 1 wherein the special ethylenically unsaturated monomer is methyl methacrylate.

11. A process as in claim 1 wherein the special ethylenically unsaturated monomer is methyl alpha-chloracrylate.

12. A process as in claim 1 wherein the monomer (A) is methyl methacrylate.

13. A process as in claim 1 wherein the monomer (A) is lauryl methacrylate.

14. A process as in claim 1 wherein the monomer (A) is vinylidene chloride.

15. A process as in claim 1 wherein the thermally polymerizable monoethylenically unsaturated monomer described in (A) is a member of the group consisting of alkyl esters of alpha-alkylacrylic acids, alkyl esters of alpha-chloroacrylic acids, vinylidene chloride and acrolein.

References Cited in the file of this patent

UNITED STATES PATENTS

| | | |
|---|---|---|
| 1,938,730 | Tschunkur et al. | Dec. 12, 1933 |
| 2,356,091 | Roedel | Aug. 15, 1944 |
| 2,388,685 | Guss et al. | Nov. 13, 1945 |
| 2,460,300 | Le Fevre et al. | Feb. 1, 1949 |
| 2,610,962 | Smyers et al. | Sept. 16, 1952 |
| 2,614,089 | Harrison et al. | Oct. 14, 1952 |
| 2,666,025 | Nozaki | Jan. 12, 1954 |
| 2,666,042 | Nozaki | Jan. 12, 1954 |

OTHER REFERENCES

Blout et al.: "Monomers," section on "Vinyl Chloride," page 28, published by Interscience Pub., Inc., New York, 1949.